United States Patent
Kouchi

(10) Patent No.: US 8,825,298 B2
(45) Date of Patent: Sep. 2, 2014

(54) VEHICLE STEERING SYSTEM

(71) Applicant: JTEKT Corporation, Osaka (JP)

(72) Inventor: Tatsuma Kouchi, Kashiwara (JP)

(73) Assignee: JTEKT Corporation, Osaka (JP)

( * ) Notice: Subject to any disclaimer, the term of this patent is extended or adjusted under 35 U.S.C. 154(b) by 126 days.

(21) Appl. No.: 13/679,297

(22) Filed: Nov. 16, 2012

(65) Prior Publication Data

US 2013/0138296 A1    May 30, 2013

(30) Foreign Application Priority Data

Nov. 25, 2011    (JP) .................................. 2011-258114

(51) Int. Cl.
*B62D 6/00* (2006.01)
*B62D 5/04* (2006.01)

(52) U.S. Cl.
CPC *B62D 6/00* (2013.01); *B62D 6/008* (2013.01); *B62D 5/0472* (2013.01)
USPC .......................................... 701/41; 180/446

(58) Field of Classification Search
CPC ............ B62D 6/008; B62D 6/00; B62D 5/00; B62D 5/0409; B62D 5/0463

USPC ....................... 701/41, 42; 180/443, 446, 421
See application file for complete search history.

(56) References Cited

FOREIGN PATENT DOCUMENTS

| JP | A-60-259570 | 12/1985 |
|----|---|---|
| JP | 10-310075 | * 11/1998 |
| JP | A-10-310075 | 11/1998 |

* cited by examiner

*Primary Examiner* — Thomas Tarcza
*Assistant Examiner* — Kevin Myhre
(74) *Attorney, Agent, or Firm* — Oliff PLC

(57) ABSTRACT

An acceleration sensor is attached to a rack housing. A FFT processing unit converts a signal output from the acceleration sensor, which is a time-domain signal, into a frequency-domain signal. An inverse input vibration component extraction unit extracts a signal, of which the frequency (f) falls within a predetermined range (fL≤f≤fH (fH>fL)) and of which the power density (ρ) falls within a predetermined range (ρL≤ρ≤ρH (ρH>ρL)), from the frequency-domain signal obtained by the FFT processing unit. An IFFT processing unit converts the frequency-domain signal extracted by the inverse input vibration component extraction unit into a time-domain signal (estimated inverse input vibration).

3 Claims, 5 Drawing Sheets

VEHICLE STEERING SYSTEM

INCORPORATION BY REFERENCE

The disclosure of Japanese Patent Application No. 2011-258114 filed on Nov. 25, 2011 including the specification, drawings and abstract, is incorporated herein by reference in its entirety.

BACKGROUND OF THE INVENTION

1. Field of the Invention

The invention relates to a vehicle steering system. An example of the vehicle steering system is an electric power steering system.

2. Description of Related Art

Japanese Patent Application Publication No. 60-259570 (JP 60-259570 A) describes an electric power steering system that detects a tie rod thrust with the use of a tie rod thrust sensor, and that controls an electric motor using the detected tie rod thrust. Japanese Patent Application Publication No. 10-310075 (JP 10-310075 A) describes a steer-by-wire steering system in which a vibration sensor is attached to a steered shaft, and a reaction force that should be applied to a steering wheel is calculated by taking into account a vibration detected by the vibration sensor.

SUMMARY OF THE INVENTION

It is an object of the invention to provide a vehicle steering system that estimates a high-frequency vibration input into a tie rod from a steered wheel side according to a novel estimation method and transmits the high-frequency vibration to a steering member, thereby improving a steering feel.

An aspect of the invention relates to a vehicle steering system, including: a steered shaft that transmits a force for steering a steered wheel, to the steered wheel via a tie rod; a housing that is connected to a vehicle body, and that supports the steered shaft such that the steered shaft is able to reciprocate in an axial direction of the steered shaft; an acceleration sensor that is attached to the housing or the tie rod; an inverse input vibration estimation unit that estimates an inverse input vibration input into the tie rod from the steered wheel side, based on a signal output from the acceleration sensor; and an inverse input vibration transmission unit that transmits the inverse input vibration estimated by the inverse input vibration estimation unit to a steering member that is operated to steer a vehicle. The inverse input vibration estimation unit includes: a FFT processing unit that converts the signal output from the acceleration sensor, which is a time-domain signal, into a frequency-domain signal; an extraction unit that extracts a frequency-domain signal, of which a frequency falls within a predetermined range and of which a power density falls within a predetermined range, from the frequency-domain signal obtained by the FFT processing unit; and an IFFT processing unit that extracts an inverse input vibration component contained in the signal output from the acceleration sensor by converting the frequency-domain signal extracted by the extraction unit into a time-domain signal.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
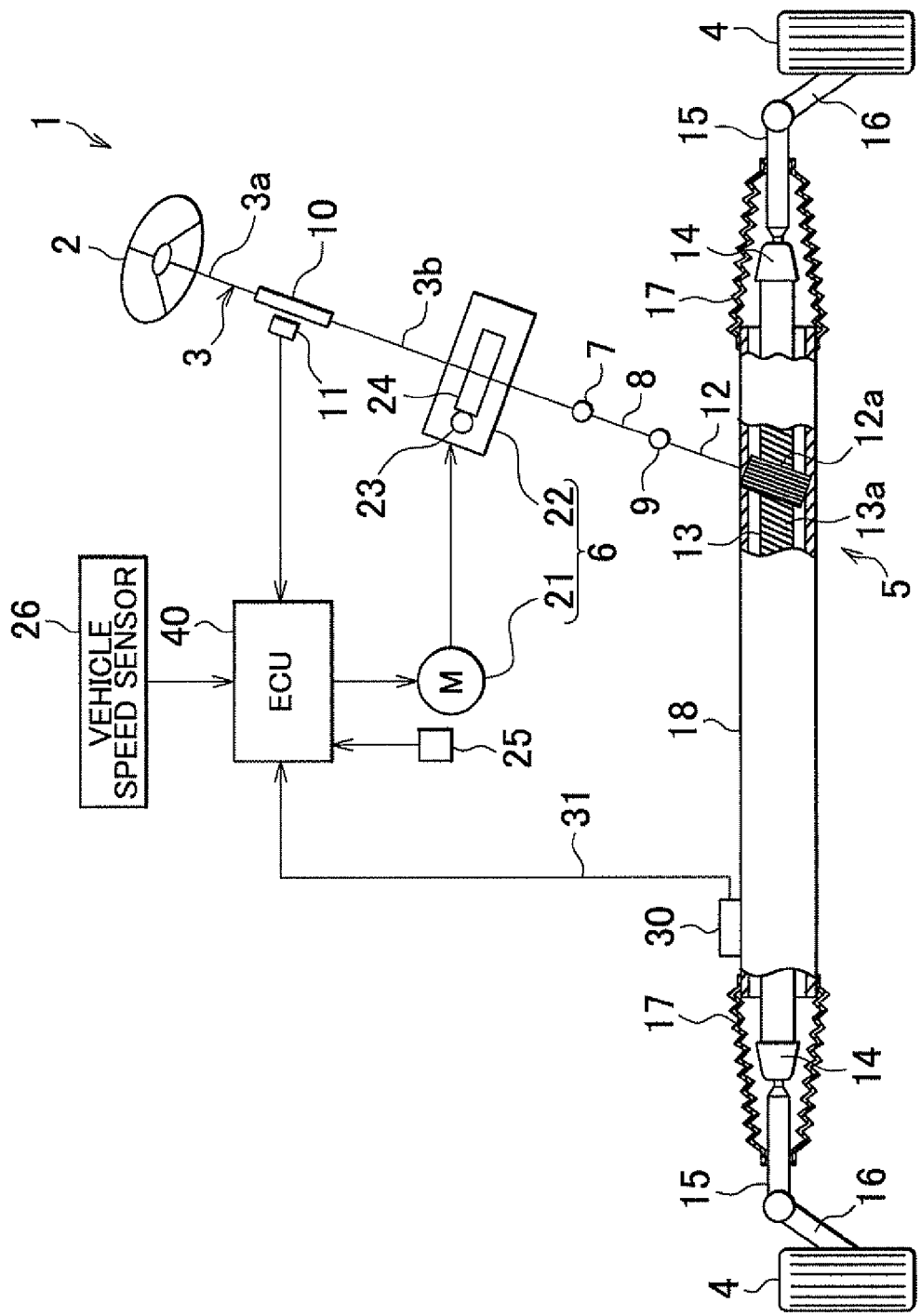
FIG. 1 is a schematic view that shows the schematic configuration of an electric power steering system (an example of a vehicle steering system) according to an embodiment of the invention.

Hereinafter, embodiments of the invention will be described in detail with reference to the accompanying drawings. FIG. 1 is a schematic view that shows the schematic configuration of an electric power steering system 1 (an example of a vehicle steering system) according to an embodiment of the invention. The electric power steering system 1 includes a steering shaft 3, a steered mechanism 5 and a steering assist mechanism 6. The steering shaft 3 is coupled to a steering wheel 2 that may function as a steering member. The steered mechanism 5 steers steered wheels 4 in accordance with rotation of the steering wheel 2. The steering assist mechanism 6 assists a driver in performing a steering operation.

The steering shaft 3 extends linearly. The steering shaft 3 is coupled to an intermediate shaft 8 via a first universal joint 7. The intermediate shaft 8 is coupled to the steered mechanism 5 (specifically, a pinion shaft 12 (described later)) via a second universal joint 9. Thus, the steering wheel 2 is mechanically coupled to the steered mechanism 5 via the steering shaft 3, the first universal joint 7, the intermediate shaft 8 and the second universal joint 9.

The steering shaft 3 includes an input shaft 3a and an output shaft 3b. The input shaft 3a is coupled to the steering wheel 2. The output shaft 3b is coupled to the intermediate shaft 8. The input shaft 3a and the output shaft 3b are coupled to each other via a torsion bar 10 so as to be rotatable relative to each other on the same axis. That is, when the steering wheel 2 is rotated, the input shaft 3a and the output shaft 3b rotate in the same direction while rotating relative to each other.

A torque sensor 11 is arranged around the steering shaft 3. The torque sensor 11 detects a steering torque T applied to the steering wheel 2 on the basis of a relative rotation displacement between the input shaft 3a and the output shaft 3b. A signal output from the torque sensor 11 is input into an electronic control unit (ECU) 40. The steered mechanism 5 includes the pinion shaft 12 and a rack shaft 13 that may function as a steered shaft. The rack shaft 13 extends linearly in the lateral direction of a vehicle. The rack shaft 13 is supported in a rack housing 18, which is fixed to a vehicle body, via a plurality of bearings (not shown) so as to be able to make a linear reciprocating motion in its axial direction. Each of the end portions of the rack shaft 13 protrudes from a corresponding one of the end portions of the rack housing 18. Each of the end portions of the rack shaft 13 is coupled to one end portion of a corresponding one of tie rods 15 via a ball joint 14. The other end portion of each of the tie rods 15 is coupled to a corresponding one of the steered wheels 4 via a knuckle arm 16.

Each of the ball joints 14 is accommodated in a tubular bellows 17. Each of the bellows 17 extends from the end portion of the rack housing 18 to the tie rod 15. One end portion and the other end portion of each of the bellows 17 are connected to the end portion of the rack housing 18 and the tie rod 15, respectively. The pinion shaft 12 is coupled to the intermediate shaft 8 via the second universal joint 9. A pinion 12a is coupled to the distal end portion of the pinion shaft 12. A rack 13a is formed in a middle portion of the rack shaft 13 in the axial direction. The rack 13a is in mesh with the pinion 12a. A rack and pinion mechanism formed of the rack 13a and the pinion 12a constitutes steering gears. The rotation of the pinion shaft 12 is converted into a movement of the rack shaft 13 in the axial direction by the steering gears. The steered wheels 4 are steered by moving the rack shaft 13 in the axial direction.

When the steering wheel 2 is steered (rotated), the rotation is transmitted to the pinion shaft 12 via the steering shaft 3 and the intermediate shaft 8. Then, the rotation of the pinion shaft 12 is converted into a movement of the rack shaft 13 in the axial direction by the steering gears 12a, 13a, As a result, the steered wheels 4 are steered. The steering assist mechanism 6 includes a steering assist electric motor 21 and a speed reduction mechanism 22. The speed reduction mechanism 22 transmits the torque output from the electric motor 21, to the steered mechanism 5. The speed reduction mechanism 22 is formed of a worm gear mechanism that includes a worm shaft 23 and a worm wheel 24 that is in mesh with the worm shaft 23. The worm shaft 23 is rotated by the electric motor 21. The worm wheel 24 is coupled to the steering shaft 3 so as to be rotatable in the same direction as the steering shaft 3.

When the worm shaft 23 is rotated by the electric motor 21, the worm wheel 24 is rotated and the steering shaft 3 rotates. Then, the rotation of the steering shaft 3 is transmitted to the pinion shaft 12 via the intermediate shaft 8. The rotation of the pinion shaft 12 is converted into a movement of the rack shaft 13 in the axial direction. In this way, the steered wheels 4 are steered. That is, when the worm shaft 23 is rotated by the electric motor 21, the steered wheels 4 are steered.

An acceleration sensor 30 is attached to the outer face of the rack housing 18. A harness 31 of the acceleration sensor 30 is connected to the ECU 40. The acceleration sensor 30 detects an acceleration (rack housing acceleration αR) of the rack housing 18. The acceleration sensor 30 is provided in order to estimate a vibration input into the tie rod 15 from the steered wheel 4 side (hereinafter, referred to as "inverse input vibration").

A signal output from the acceleration sensor 30 is input into the ECU 40. In addition, a signal output from a vehicle speed sensor 26 is input into the ECU 40. The ECU 40 controls the electric motor 21 on the basis of, for example, a steering torque T, a vehicle speed V, and an inverse input vibration. The steering torque T is computed on the basis of a signal output from the torque sensor 11. The vehicle speed V is detected by the vehicle speed sensor 26. The inverse input vibration is estimated on the basis of a signal output from the acceleration sensor 30.

Figure 2:
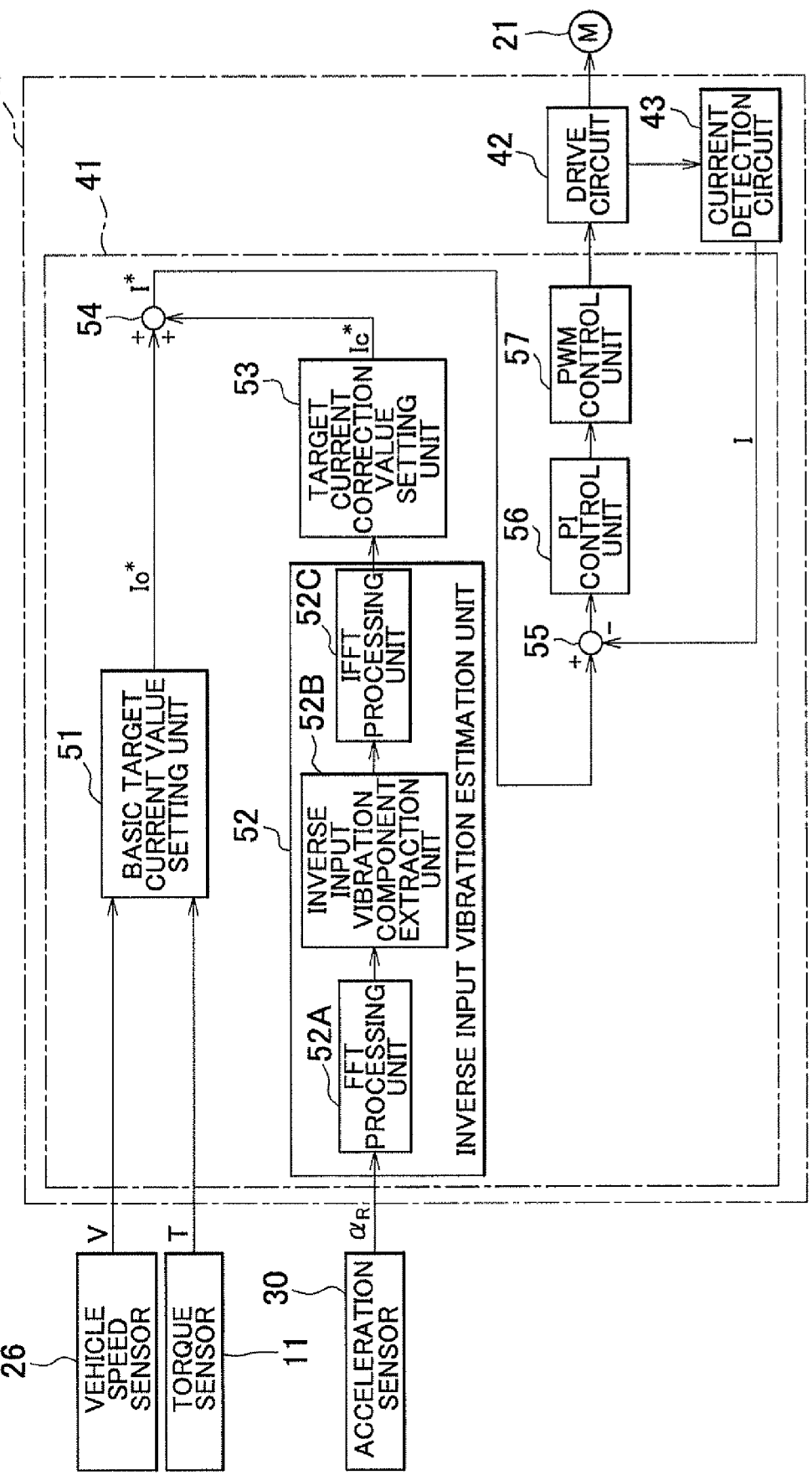
FIG. 2 is a block diagram that schematically shows the electrical configuration of an ECU.

FIG. 2 is a block diagram that schematically shows the electrical configuration of the ECU 40. The ECU 40 includes a microcomputer (motor control microcomputer) 41, a drive circuit (inverter circuit) 42 and a current detection circuit 43.

The microcomputer 41 controls the electric motor 21. The drive circuit 42 is controlled by the microcomputer 41, and supplies electric power to the electric motor 21. The current detection circuit 43 detects a motor current (actual current value) I that flows through the electric motor 21.

The microcomputer 41 includes a CPU and memories (e.g. ROM, a RAM). The microcomputer 41 functions as a plurality of functional processing units by executing predetermined programs. The functional processing units include a basic target current value setting unit 51, an inverse input vibration estimation unit 52, a target current correction value setting unit 53, a correction value addition unit 54, a deviation computation unit 55, a PI control unit 56 and a PWM control unit 57.

Figure 3:
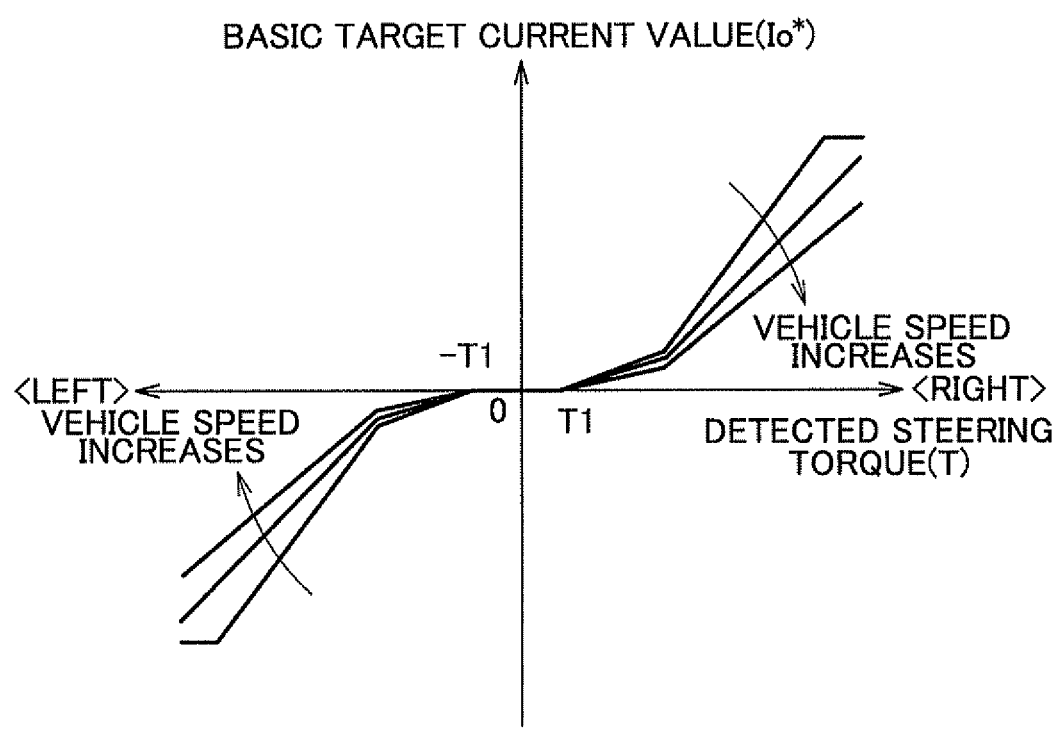
FIG. 3 is a graph that shows an example of a manner of setting a basic target current value.

The basic target current value setting unit 51 sets a basic target current value Io* on the basis of the steering torque T and the vehicle speed V. The steering torque T is detected by the torque sensor 11. The vehicle speed V is detected by the vehicle speed sensor 26. An example of a manner of setting the basic target current value Io* with respect to the detected steering torque T is shown in FIG. 3. The detected steering torque T is defined, for example, such that a torque for steering to the right takes a positive value and a torque for steering to the left takes a negative value. The basic target current value Io* takes a positive value when a steering assist force for steering to the right should be generated by the electric motor 21, and takes a negative value when a steering assist force for steering to the left should be generated by the electric motor 21. The basic target current value Io* with respect to a positive value of the detected steering torque T takes a positive value, and the basic target current value Io* with respect to a negative value of the detected steering torque T takes a negative value. When the detected steering torque T is a small value within a range (torque dead zone) from −T1 to T1 (for example, T1=0.4 N·m), the basic target current value Io* is set to zero. In addition, as the vehicle speed V detected by the vehicle speed sensor 26 increases, the absolute value of the basic target current value Io* is set to be smaller. Thus, a large steering assist force is generated when the vehicle is travelling at a low speed, and the steering assist force is reduced when the vehicle is travelling at a high speed.

The inverse input vibration estimation unit 52 estimates an inverse input vibration that is input into the tie rod 15 on the basis of the rack housing acceleration αR detected by the acceleration sensor 30. The inverse input vibration input into the tie rod 15 has a high frequency of approximately 10 Hz to 100 Hz. Because the rack shaft 13 is supported by the rack housing 18 via bearings (not shown), an axial load applied to the tie rod 15 coupled to the rack shaft 13 is transmitted to the rack housing 18 via the bearings. Thus, it is considered that an acceleration that corresponds to the axial load applied to the tie rod 15 appears in a signal output from the acceleration sensor 30 attached to the rack housing 18.

Figure 5:
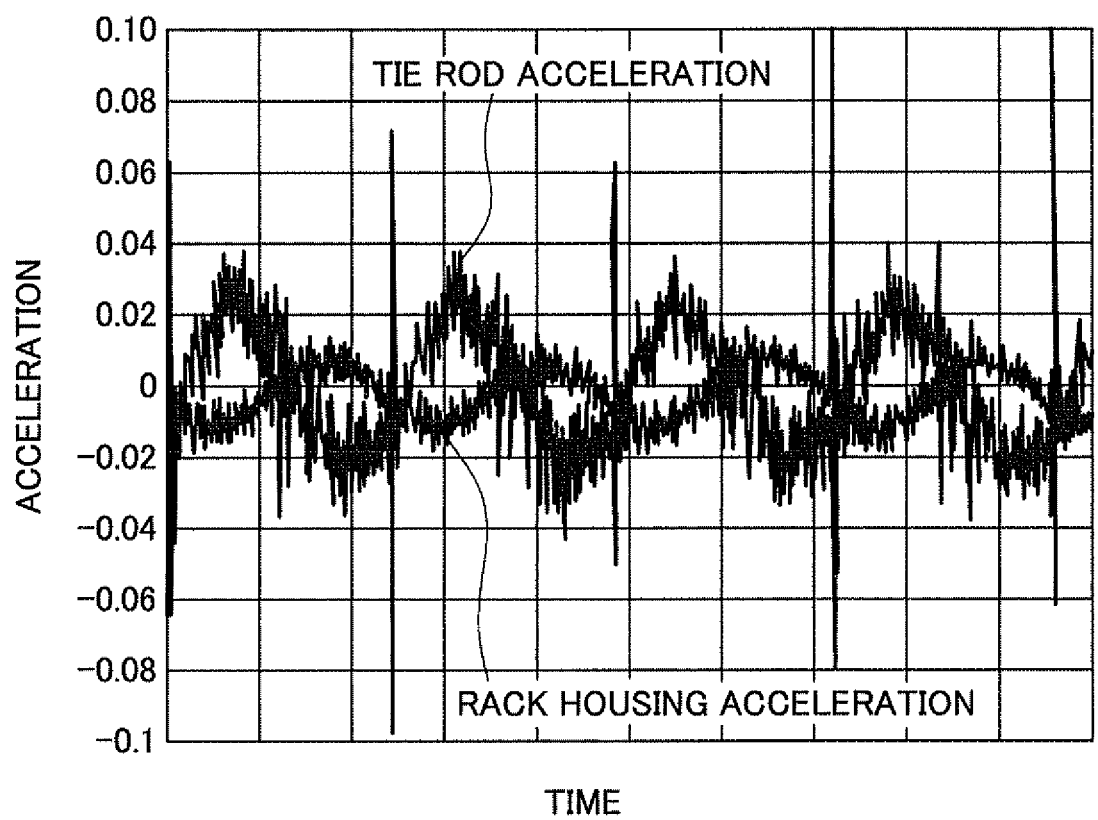
FIG. 5 is a graph that shows a tie rod acceleration and a rack housing acceleration that are empirically measured.

Therefore, the inventor conducted the following experiment. Acceleration sensors having the same characteristics were respectively attached to the rack housing 18 and one of the tie rods 15. Then, a sinusoidal axial load was applied to the tie rod 15, and a rack housing acceleration and a tie rod acceleration were detected based on signals output from the acceleration sensors. The result of the experiment is shown in FIG. 5. FIG. 5 shows that an acceleration (tie rod acceleration) that corresponds to the axial load applied to the tie rod 15 appears in the signal (rack housing acceleration) output from the acceleration sensor attached to the rack housing 18. In addition, FIG. 5 shows that the rack housing acceleration has a low correlation with the tie rod acceleration in a static range (low-frequency range close to 0 Hz) but the rack housing acceleration has a high correlation with the tie rod acceleration in a dynamic range such as a high-frequency range. In the high-frequency range, because the rack housing acceleration has a high correlation with the tie rod acceleration as described above, it is possible to estimate the inverse input vibration input from the steered wheel 4 side into the tie rod 15 on the basis of the rack housing acceleration.

Most of the inverse input vibration input into the tie rod 15 disappears due to, for example, friction in a power transmission path from the tie rod 15 to the steering wheel 2. Therefore, the inverse input vibration is hardly transmitted to the steering wheel 2. Accordingly, the road surface condition is not transmitted to the driver and the steering feel is not good. According to the present embodiment, it is possible to transmit the inverse input vibration input into the tie rod 15 to the steering wheel 2.

Figure 4A:
FIG. 4A is a graph that shows a signal output from an acceleration sensor.
Figure 4B:
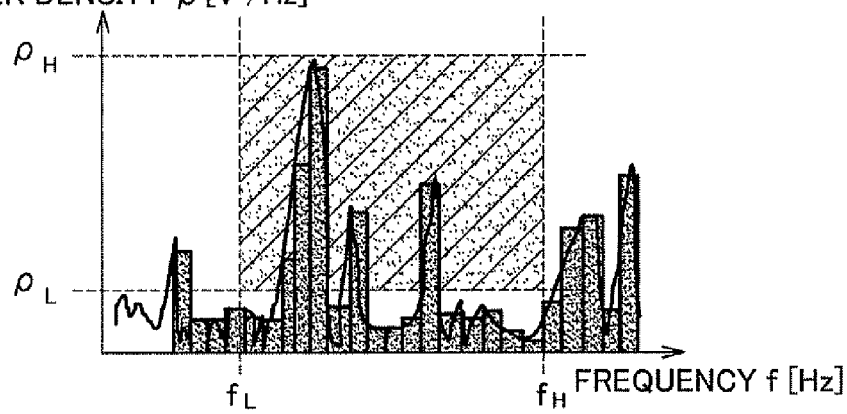
FIG. 4B is a graph that shows a frequency-domain signal obtained by a FFT processing unit.
Figure 4C:
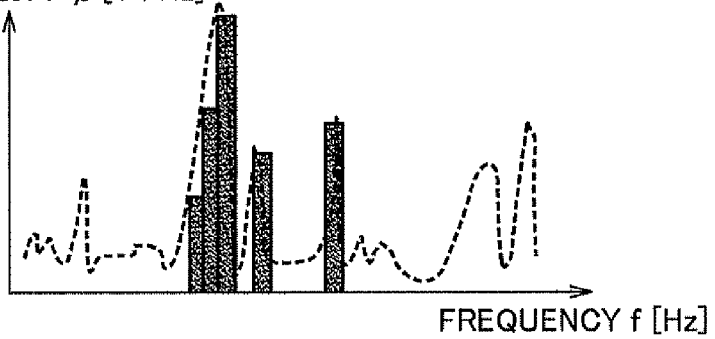
FIG. 4C is a graph that shows a frequency-domain signal corresponding to an inverse input vibration component, which is extracted by an inverse input vibration component extraction unit.
Figure 4D:
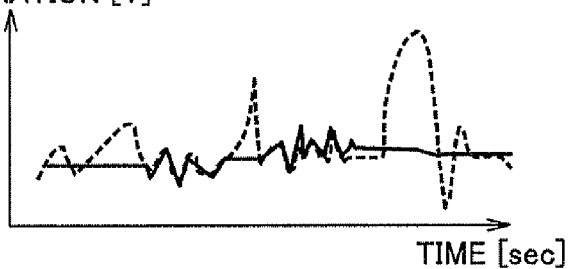
FIG. 4D is a graph that shows a time-domain signal corresponding to an inverse input vibration component, which is obtained by an IFFT processing unit.

Referring back to FIG. 2, the inverse input vibration estimation unit 52 includes a Fast Fourier transform (FFT) processing unit 52A, an inverse input vibration component extraction unit 52B and an Inverse Fast Fourier transform (IFFT) processing unit 52C. FIG. 4A is a graph that shows a signal output from the acceleration sensor 30. FIG. 4B is a graph that shows a frequency-domain signal obtained by the FFT processing unit 52A. FIG. 4C is a graph that shows a frequency-domain signal that corresponds to the inverse input vibration component, which is extracted by the inverse input vibration component extraction unit 52B. FIG. 4D is a graph that shows a time-domain signal that corresponds to the inverse input vibration component, which is obtained by the IFFT processing unit 52C.

The FFT processing unit 52A converts the signal output from the acceleration sensor 30 as shown in FIG. 4A, which is a time-domain signal, into a frequency-domain signal. Thus, the frequency-domain signal as shown in FIG. 4B is obtained. The inverse input vibration component extraction unit 52B extracts a signal (signal in a range indicated by diagonal lines in FIG. 4B) of which the frequency f falls within a predetermined range (fL≤f≤fH (fH>fL)) and of which the power density ρ falls within a predetermined range (ρL≤ρ≤ρH (ρH>ρL)) from the frequency-domain signal obtained by the FFT processing unit 52A. Thus, the frequency-domain signal that corresponds to the inverse input vibration component as shown in FIG. 4C is extracted.

fL is a threshold that is set to exclude a frequency-domain signal having a frequency lower than the inverse input vibration component from the frequency-domain signal obtained by the FFT processing unit 52A, and is set to, for example, 10 Hz. fH is a threshold that is set to remove noise from the frequency-domain signal obtained by the FFT processing unit 52A, and is set to, for example, 100 Hz. ρL is a threshold that is set to remove noise from the frequency-domain signal obtained by the FFT processing unit 52A, and is set to, for example, $10^{-4}$ [$V^2$/Hz]. ρH is a threshold that is set to exclude a frequency-domain signal having a power density lager than the inverse input vibration component from the frequency-domain signal obtained by the FFT processing unit 52A, and is set to, for example, 1 [$V^2$/Hz].

The IFFT processing unit 52C converts the frequency-domain signal extracted by the inverse input vibration component extraction unit 52B into a time-domain signal. Thus, the time-domain signal that corresponds to the inverse input vibration component as shown in FIG. 4D is obtained. The time-domain signal that corresponds to the inverse input vibration component is an estimated value of the inverse input vibration input into the tie rod 15. The estimated inverse input vibration obtained by the IFFT processing unit 52C takes a positive value when the direction of the vibration is the axial direction of the tie rod 15 that corresponds to steering to the right, and takes a negative value when the direction of the vibration is the axial direction of the tie rod 15 that corresponds to steering to the left.

The target current correction value setting unit 53 sets a target current correction value Ic* on the basis of the estimated inverse input vibration obtained by the inverse input vibration estimation unit 52. The target current correction value Ic* takes a positive value when the estimated inverse input vibration is a positive value, and takes a negative value when the estimated inverse input vibration is a negative value. The target current correction value Ic* is set such that the absolute value of the target current correction value Ic* increases as the absolute value of the estimated inverse input vibration increases. The target current correction value setting unit 53 computes the target current correction value Ic*, for example, by multiplying the estimated inverse input vibration by a multiplication coefficient (>0) set in advance. The target current correction value setting unit 53 may set the target current correction value Ic* on the basis of a map that stores in advance the correlation between the estimated inverse input vibration and the target current correction value Ic*.

The correction value addition unit 54 computes a target current value I* by adding the target current correction value Ic* set by the target current correction value setting unit 53 to the basic target current value Io* set by the basic target current value setting unit 51. The deviation computation unit 55 computes a deviation (current deviation ΔI=I*−I) between the target current value I* obtained by the correction value addition unit 54 and the actual current value I detected by the current detection circuit 43.

The PI control unit 56 generates a drive command value for bringing the current I that flows through the electric motor 21 to the target current value I* by executing PI computation on the current deviation ΔI computed by the deviation computation unit 55. The PWM control unit 57 generates a PWM control signal having a duty ratio that corresponds to the drive command value, and provides the PWM control signal to the drive circuit 42. As a result, electric power that corresponds to the drive command value is supplied to the electric motor 21.

The basic target current value setting unit 51, the inverse input vibration estimation unit 52, the target current correction value setting unit 53 and the correction value addition unit 54 constitute a target current value setting unit that sets the target current value I*. The deviation computation unit 55 and the P1 control unit 56 constitute current feedback control unit. Due to the action of the current feedback control unit, the motor current I that flows through the electric motor 21 is controlled so as to approach the target current value I* set by the target current value setting units 51 to 54.

According to the above-described embodiment, the acceleration sensor 30 used to estimate the inverse input vibration input into the tie rod 15 is attached to the rack housing 18 that moves by a smaller amount than the tie rod 15. Therefore, the movement of the harness of the acceleration sensor 30 is smaller than that when the acceleration sensor 30 is attached to one of the tie rod 15. As a result, the harness of the acceleration sensor 30 is less likely to be damaged.

Even when the acceleration sensor 30 is attached to the rack housing 18 as described above, it is possible to estimate the inverse input vibration input into the tie rod 15 on the basis of the signal output from the acceleration sensor 30. Because the target current value I* for the electric motor 21 is set on the basis of the estimated inverse input vibration, the inverse input vibration input into the tie rod 15 is transmitted to the steering wheel 2. Accordingly, it is possible to transmit the road surface condition to the driver. As a result, the steering feel improves.

The embodiment of the invention has been described above. However, the invention may be implemented in various other embodiments. For example, in the above-described embodiment, the acceleration sensor 30 is attached to the rack housing 18. Alternatively, the acceleration sensor 30 may be attached to one of the tie rods 15. In addition, the invention may be applied to a so-called steer-by-wire vehicle steering system in which a steering member, such as a steering wheel, and steered wheels are not mechanically coupled to each other, and that includes a reaction motor that applies steering reaction force to the steering member. In this case, a target current value for the reaction motor is set on the basis of an inverse input vibration estimated by the inverse input vibration estimation unit 52 and the reaction motor is controlled such that a current that flows through the reaction motor approaches the target current value. Accordingly, the inverse input vibration estimated by the inverse input vibration estimation unit 52 is transmitted to the steering member via the reaction motor. As a result, it is possible to improve the steering feel.

Other than the above, various design changes may be made within the scope of the appended claims.

What is claimed is:

1. A vehicle steering system, comprising:
a steered shaft that transmits a force for steering a steered wheel, to the steered wheel via a tie rod;
a housing that is connected to a vehicle body, and that supports the steered shaft such that the steered shaft is able to reciprocate in an axial direction of the steered shaft;
an acceleration sensor that is attached to the housing or the tie rod;
an inverse input vibration estimation unit that estimates an inverse input vibration input into the tie rod from the steered wheel side, based on a signal output from the acceleration sensor; and
an inverse input vibration transmission unit that transmits the inverse input vibration estimated by the inverse input vibration estimation unit to a steering member that is operated to steer a vehicle, wherein
the inverse input vibration estimation unit includes:
a FFT processing unit that converts the signal output from the acceleration sensor, which is a time-domain signal, into a frequency-domain signal;
an extraction unit that extracts a frequency-domain signal, of which a frequency falls within a predetermined range and of which a power density falls within a predetermined range, from the frequency-domain signal obtained by the FFT processing unit; and
an IFFT processing unit that extracts an inverse input vibration component contained in the signal output from the acceleration sensor by converting the frequency-domain signal extracted by the extraction unit into a time-domain signal.

2. The vehicle steering system according to claim 1, wherein
the inverse input vibration transmission unit includes:
an electric motor that applies a steering assist force to the steered shaft;
a target current value setting unit that sets a target current value for the electric motor based on the inverse input vibration estimated by the inverse input vibration estimation unit; and
a control unit that controls the electric motor based on the target current value set by the target current value setting unit.

3. The vehicle steering system according to claim 1, wherein
the inverse input vibration transmission unit includes:
a reaction motor that is used to apply a steering reaction force to the steering member;
a target current value unit that sets a target current value for the reaction motor based on the inverse input vibration estimated by the inverse input vibration estimation unit; and
a control unit that controls the reaction motor based on the target current value set by the target current value setting unit.

* * * * *